US008289202B1

(12) United States Patent  (10) Patent No.: US 8,289,202 B1
Christianson  (45) Date of Patent: Oct. 16, 2012

(54) METHOD AND SYSTEM FOR GENERATING WEATHER AND GROUND REFLECTIVITY INFORMATION

(75) Inventor: Paul Christianson, Seattle, WA (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 13/079,105

(22) Filed: Apr. 4, 2011

(51) Int. Cl.
  *G01S 13/95* (2006.01)
(52) U.S. Cl. .................................. 342/26 B; 342/195
(58) Field of Classification Search .......... 342/26 R, 342/26 A–26 D, 195
  See application file for complete search history.

(56) References Cited

U.S. PATENT DOCUMENTS

| | | | | | |
|---|---|---|---|---|---|
| 4,283,725 | A | * | 8/1981 | Chisholm | 342/174 |
| 4,649,388 | A | * | 3/1987 | Atlas | 342/26 D |
| 5,359,330 | A | * | 10/1994 | Rubin et al. | 342/26 D |
| 6,707,415 | B1 | | 3/2004 | Christianson | |
| 7,242,343 | B1 | * | 7/2007 | Woodell | 342/26 B |
| 7,307,576 | B1 | * | 12/2007 | Koenigs | 342/26 R |
| 7,667,635 | B2 | * | 2/2010 | Tillotson | 342/26 B |
| 7,808,422 | B1 | | 10/2010 | Woodell et al. | |
| 8,068,050 | B2 | * | 11/2011 | Christianson | 342/26 B |
| 8,120,523 | B2 | * | 2/2012 | Kemkemian et al. | 342/26 R |
| 2010/0164786 | A1 | * | 7/2010 | Costes et al. | 342/26 R |
| 2010/0245166 | A1 | * | 9/2010 | Kirk et al. | 342/26 B |
| 2010/0245167 | A1 | * | 9/2010 | Bunch et al. | 342/26 B |
| 2012/0086596 | A1 | * | 4/2012 | Insanic et al. | 342/26 D |
| 2012/0139778 | A1 | * | 6/2012 | Bunch et al. | 342/26 B |

FOREIGN PATENT DOCUMENTS

EP 2216660 A2 * 8/2010

OTHER PUBLICATIONS

Yuchum Gao et al., Initialization Analysis of IIR Ground Clutter Filter in Doppler Weather Radar, IEEE 2007 International Symposium on Microwave, Antenna, Propagation, and EMC Technologies for Wireless Communications, Beijing University of Posts and Telecommunications, Beijing 100876, China; Key Laboratory of Atmosphere Sounding China Meteorological Administration, Sichuan 610225, China.

* cited by examiner

*Primary Examiner* — John B Sotomayor
(74) *Attorney, Agent, or Firm* — Lowe Graham Jones PLLC

(57) ABSTRACT

A method, system, and computer program product for storing weather radar return data into a three-dimensional buffer. The system located on an aircraft includes a radar system that transmits a radar signal and generates a radar measurement as a result of radar return of the transmitted radar signal. A three-dimensional buffer includes a plurality of storage locations. A processor generates or updates a reflectivity value in storage locations in the three-dimensional buffer based on the generated radar measurement, a previously stored reflectivity value for the storage location, and uncertainty parameters. The uncertainty parameters of normalized radar cross section for ground elements are initialized based on a type of ground associated with each of the elements. The uncertainty parameters for weather reflectivity are initialized based on a priori information. The generated reflectivity values are stored in the three-dimensional buffer according to the storage locations.

20 Claims, 2 Drawing Sheets

METHOD AND SYSTEM FOR GENERATING WEATHER AND GROUND REFLECTIVITY INFORMATION

BACKGROUND OF THE INVENTION

Attempts have been made to take radar signals received from the aircraft radar system, convert it to a reflectivity value, and store it in a location in a three-dimensional (3-D) weather buffer relative to the range associated with the radar signal. The 3-D weather buffer is an array of computer memory that includes data that describes a distribution of a weather reflectivity within a three-dimensional space. In other attempts, radar return signal power is converted to reflectivity based on certain assumptions, and used to populate elements of a 3D weather buffer.

A problem with earlier attempts is that ground clutter contamination of the desired weather signal occurs. Previous attempts to prevent ground clutter contamination have used calculations of antenna beam proximity to the assumed location of the ground, and assumptions of the ground signal scattering properties to determine the degree of signal contamination, and then to suppress the signal if it is deemed to be contaminated.

Therefore, there exists a need to more accurately identify weather information and to remove ground clutter contamination from a weather radar signal or identify ground in a weather radar signal.

U.S. Pat. No. 6,707,415, which is hereby incorporated by reference, describes a method of using radar to estimate weather and ground reflectivity for the purpose of displaying weather reflectivity relatively uncontaminated by ground signal return, or ground reflectivity that is minimally contaminated by weather. The method makes use of a parameter that represents the relative uncertainty in the current estimates of weather reflectivity and ground normalized radar cross section for all modeled locations. These parameters may or may not be updated in response to new measurements (which reduce the uncertainty in the estimated values). However, in either case starting values for the uncertainty parameters for weather and ground reflectivity must be chosen.

As for any estimation process, the separate estimation of weather and ground reflectivity is not perfect. Occasionally, some weather signal will result in increased estimated ground reflectivity, and vice versa.

SUMMARY OF THE INVENTION

The present invention is a method, system, and computer program product for storing weather radar reflectivity data into a three-dimensional buffer. The method involves modeling the radar signal scattering properties of space surrounding the radar/aircraft. Present radar measurements are compared to predictions of the measurement using a model of the measurement process. A difference between the present radar measurements and the predictions of the measurement is used to adjust the stored reflectivity values.

Distribution of ground surface normalized radar cross section (NRCS) is estimated in a manner similar to weather reflectivity estimation. For the ground, the buffer represents the NRCS distribution in two dimensions to describe the ground surface, rather than the three dimensions to describe three-dimensional weather. Because one of the applications of an airborne radar is to provide a radar ground map, the present invention provides a ground map as an inherent part of the processing.

As will be readily appreciated from the foregoing summary, the invention provides more accurate information for storage in a three-dimensional buffer by using the radar signal power measurements to separately estimate the weather reflectivity distribution and the ground NRCS distribution. The process is performed by iteratively updating estimates of the distributions by using the difference between radar measurements and expected measurement values generated by a model of the measurement process acting on previously stored estimates of the distributions of weather reflectivity and ground NRCS.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
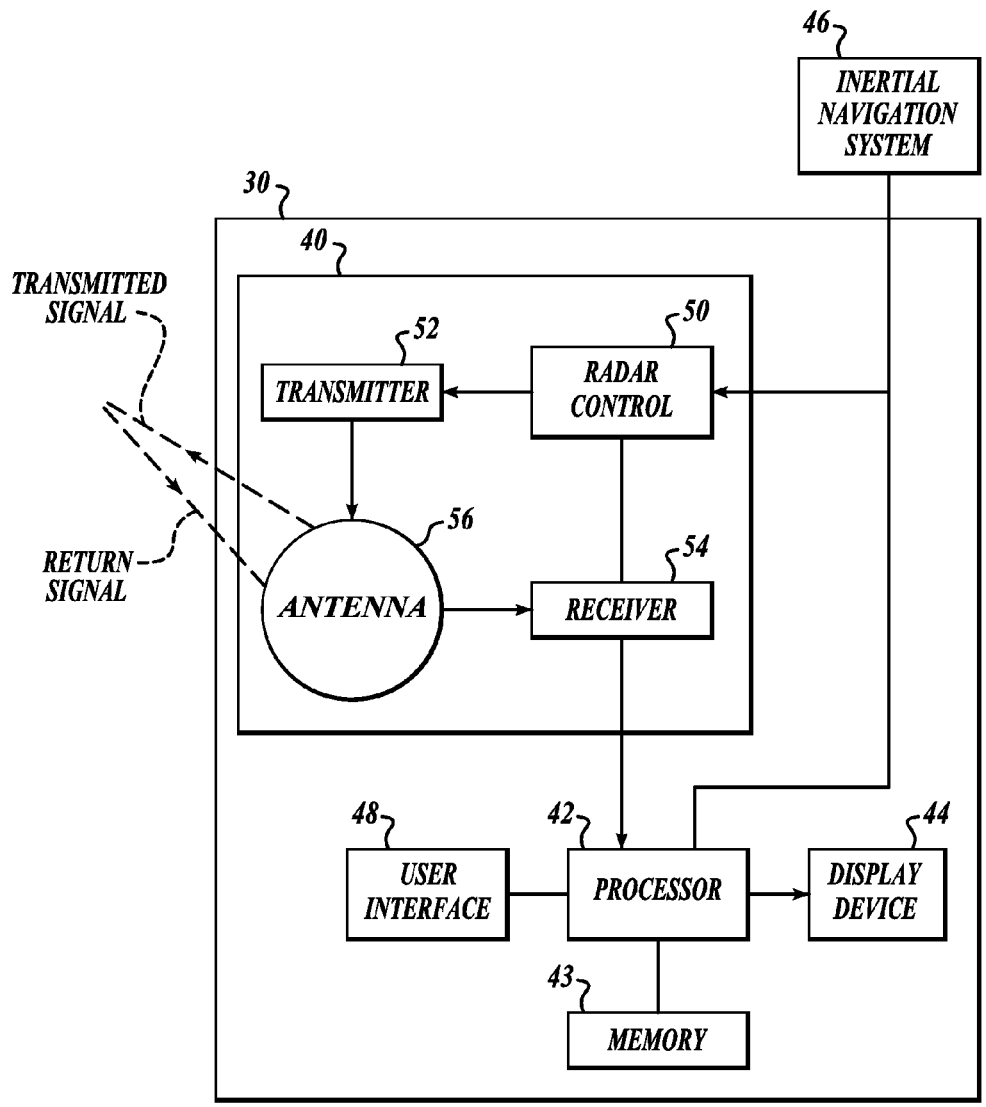
FIG. 1 is block diagram of a system that performs the present invention.

The present invention is a system, method, and computer program product for storing three-dimensional radar return data. FIG. 1 illustrates an example system 30 formed in accordance with the present invention. The system 30 includes a weather radar system 40, a processor 42, memory 43, a display device 44, an inertial navigation system (INS) 46, and a user interface 48 coupled to the processor 42. The display processor 42 is electrically coupled to the radar system 40, the display device 44, the INS 46, and the memory 43. An example radar system 40 includes a radar controller 50, a transmitter 52, a receiver 54, and an antenna 56. The radar controller 50 controls the transmitter 52 and the receiver 54 for performing the sending and receiving of signals through the antenna 56 based on aircraft data (i.e., position, heading, roll, yaw, pitch, etc.) received from the INS 46, or other aircraft systems.

The radar system 40 receives signals that arise from the scattering of transmitted pulses from the external environment including primarily of weather and terrain. The received signals are passed to the processor 42, which uses the received signals to update estimates of weather reflectivity and ground normalized radar cross section contained in computer memory (three-dimensional 3-D buffer). The processor 42 generates an image for presentation on the display device 44 based on any control signals sent from the user interface 48 or based on settings within the processor 42.

At system start up, all elements of atmosphere (i.e., 3D buffer) and all elements of ground (i.e., 2D buffer) are initialized. The initialization of each element (i.e., cell of a buffer) involves choosing values for 1) the reflectivity (for weather), or normalized radar cross-section (NRCS) (for ground), and 2) the uncertainty parameters that goes with each of the initial values for the cells for both weather and ground. The uncertainty tells the processing how much in error the initial reflectivity or NRCS value is.

For ground elements, the initial NRCS and/or uncertainty parameters could use a priori information on the surface type (i.e. water, forest, city, etc.), terrain shadowing, incident angle from radar to ground element, or other factors that alter reflectivity. For weather reflectivity, the a priori information might be uplinked weather reflectivities from other radars, and corresponding uncertainty parameters that reflect the lower uncertainty for those elements.

In one embodiment, the present invention provides tailoring the uncertainty parameters for ground elements based on expectations on how NRCS relates to type of surface. For example water is expected to have a low NRCS value, so if we initialize a water-type ground element to NRCS=0, the corresponding uncertainty is initialized to a low value because the initial NRCS should not be too much in error. In another embodiment, any a priori information is used to initialize both the element value and its uncertainty parameter—and not just for ground elements.

Figure 2:
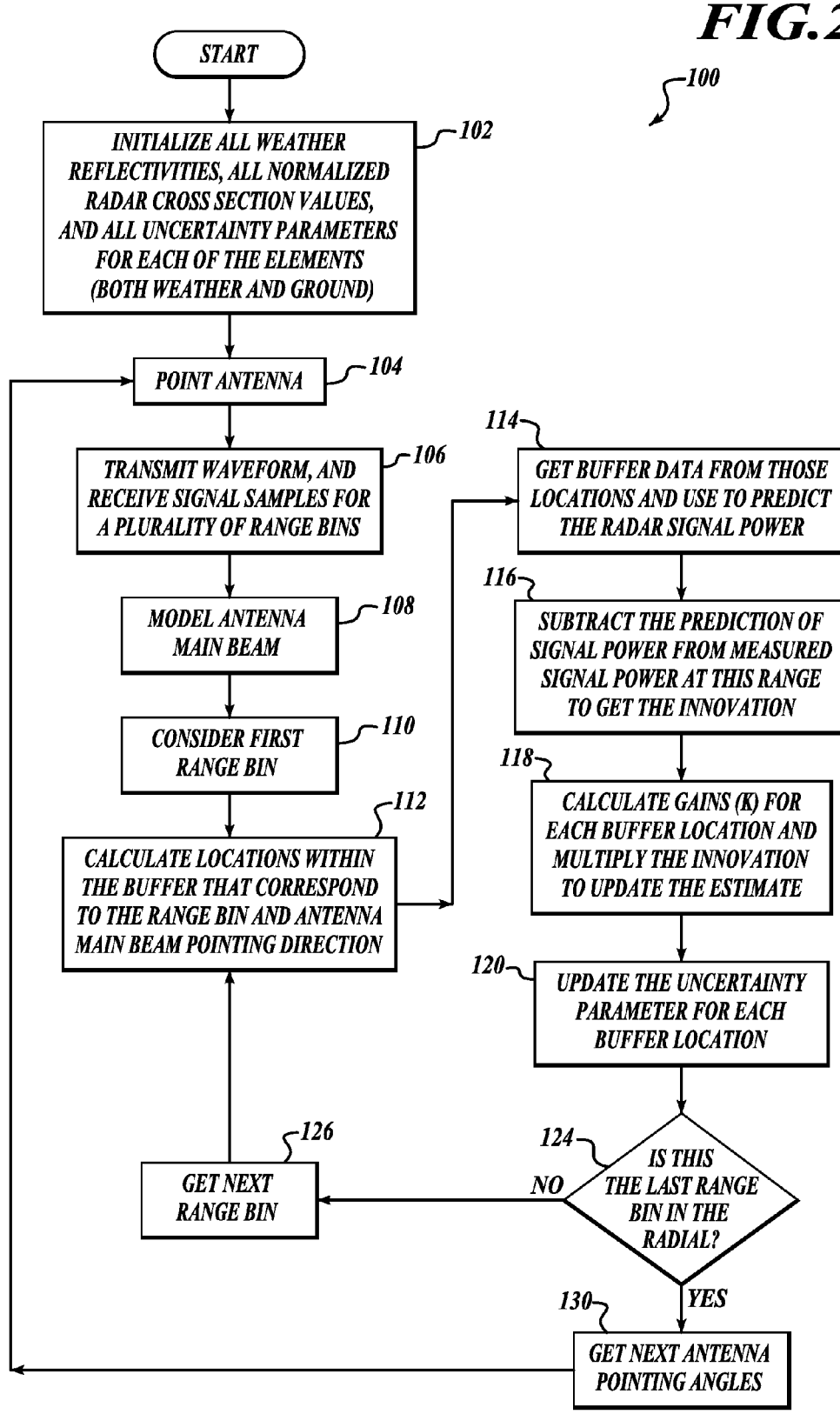
FIG. 2 illustrates a flow diagram performed by the system shown in FIG. 1.

FIG. 2 illustrates an example process 100 for storing reflectivity values in a three-dimensional display buffer. First, at a block 102, uncertainty parameters and reflectivity values associated with 3-D buffer locations are initialized to some beginning values. For example, reflectivity values may be initialized to zero, with uncertainty parameters initialized to relatively large values to indicate possibly large initial error in the reflectivity values. If the reflectivity values are initialized using additional information, such as uplinked weather reflectivities from ground-based radar, the corresponding uncertainty parameters would be initialized to lower value to indicate the reduced uncertainty in these initial reflectivities. The uncertainty parameters of normalized radar cross section for ground elements may be initialized based on a type of ground associated with each of the elements. At a block 104, the main beam of the antenna is pointed in a particular radial direction. Next, at a block 106, the radar system transmits a waveform over the antenna, and receives signal samples for a plurality of range bins based on the transmitted waveform. At a block 108, the antenna main beam is modeled according to a 2-D array of vectors. Each vector represents an increment of solid angle within the antenna main beam. Each vector has an associated antenna gain value.

Then, at a block 110, the first range bin of the receive signal is considered. As part of the consideration of the first range bin, at a block 112, the processor 42 calculates locations within the 3-D buffer that correspond to the range bin and the antenna pointing direction increments represented by the array of vectors used to model antenna main beam. Next, at a block 104, the processor 42 retrieves any data stored in the calculated locations of the 3-D buffer and uses the retrieved data to predict radar signal power. At a block 116, the processor 42 subtracts the signal power prediction from the measured signal power at the range bin, thereby generating an innovation value. At a block 118, the processor 42 calculates gains (k) for each calculated buffer location and multiplies the innovation by the calculated gain value to provide an update of the scattering parameter (weather reflectivity or ground NRCS) for each location. Next, at block 120, the processor 42 updates the uncertainty parameter for each buffer location. At a decision block 124, if the present range bin is not the last range bin in the present radial, the process 100 continues on to the next range bin of the received signal. Once the next range bin value has been retrieved, the process continues on to the block 112 until the last range bin value has been reached. When the last range bin value has been reached, as determined at the decision block 124, the system gets the next antenna pointing angle, see block 130, and returns the process to block 104 where the antenna is pointed to the retrieved next antenna pointing angle.

The following further describes the process 100 by example. An example equation for determining the reflectivity value to store in a three-dimensional storage location is as follows:

$$\hat{Z}_i = \overline{Z}_i + K_i\left(S_{meas} - \left(\sum_j h_j \overline{Z}_j + \sum_k h_k \sigma_k^0\right)\right) \quad (1)$$

First, a residual signal is determined by taking the difference between the measurement $S_{meas}$ and the prediction $$\sum_j h_j \overline{Z}_j + \sum_k h_k \sigma_k^0$$

to get a residual signal, or innovation. $\overline{Z}_i$ is the reflectivity estimate for the $i^{th}$ grid point before the measurement, $\hat{Z}_i$ is the reflectivity estimate after the measurement, $K_i$ is a filter gain to convert radar signal values into reflectivity values, $S_{meas}$ is the measured radar signal. The h is an element weight that depends upon radar beam shape and a storage location's position relative to the radar beam shape. The determination of h is described in more detail below. The corresponding equation for updating the ground NRCS values is $$\hat{\sigma}_i^0 = \overline{\sigma_i^0} + K_i\left(S_{meas} - \left(\sum_j h_j \overline{Z}_j + \sum_k h_k \sigma_k^0\right)\right)$$

The filter gain $K_i$ is shown in Equation (8).

$$K_i = \frac{h_i P_i}{\sum_n h_n^2 P_n + \sigma_v^2} \quad (2)$$

The summation in the numerator includes both weather reflectivity elements and ground NRCS elements that contribute to the measurement.

Where $P_i$ is an uncertainty parameter of the $i^{th}$ reflectivity element (from weather or ground), a $\sigma_v^2$ is a variance of an assumed additive signal fluctuation noise, and the summation is of all the reflectivity elements to be updated using the current measurement. When the $i^{th}$ reflectivity element is a ground element then $P_i$ is the uncertainty parameter of NRCS for a ground element that is initialized based on a type of ground associated with each of the elements. In other words, the initialized uncertainty parameter is based on certainty of how the ground element will reflect radar power. For example, if the ground element is associated with water (e.g., lake, ocean, etc.), then one can be highly certain that this ground element will provide little or no reflectivity effect.

The uncertainty value is essentially a variance of the error in the estimated value. At start up when initialization of the NRCS values occurs, if the type of surface is known, this knowledge allows us to place bounds on the expected error in the initial values for NRCS. For example, if it is known that the surface is water, the NRCS value is initialized to zero and the uncertainty parameter is made very small, because the true NRCS value is expected to be small and the difference between the true value and the starting value of zero (i.e. the starting estimation error) is small. On the other hand, if the element is a city, the true NRCS value is expected to have a wide range of values, including very large values. Therefore, the uncertainty (i.e. variance) in the starting estimate of zero should be large.

In addition to updating the reflectivity element values, a measurement reduces the uncertainty in the estimates. Using the same model, the change in P is shown by example in Equation (9):

$$P'_i = P_i - \frac{h_i^2 P_i^2}{\sum_n h_n^2 P_n + \sigma_v^2} \tag{3}$$

where $P_i$ is the uncertainty parameter before the measurement, and $P'_i$ is the uncertainty parameter after the measurement.

Alternate equations for filter gain K and the parameter P are as follows:

$$K_i = \frac{k_k h_i P_i}{\sum_n h_n^2 P_n + \sigma_v^2} \text{ and} \tag{4}$$

$$P'_i = P_i - \frac{k_p h_i^2 P_i^2}{\sum_n h_n^2 P_n + \sigma_v^2} \tag{5}$$

One of ordinary skill determines the constant factors $k_k$ and $k_p$ empirically. The updating of the reflectivity values in three-dimensional storage locations using radar measurements involves the interplay between the corresponding weight (h) and the corresponding uncertainty parameters (P). The larger values of h correspond to locations near the axis of the antenna main beam. As can be seen from equation (10), if the uncertainty parameters are identical for storage locations, the storage location with the larger values of h tends to receive the greatest magnitude of update. Likewise, if the h's were identical for storage locations, the storage location with the highest relative uncertainty would receive the greatest update.

With the antenna beam scanning through an array of reflectivity elements (storage locations), elements near the beam axis would get relatively large updates and relatively large reductions in uncertainty. As the beam is scanned away from those elements, those elements still receive some degree of update. But elements on the other side of the beam that have similar h values receive greater updates because their initial estimates have more uncertainty. The uncertainty parameter provides a record of sorts of where the antenna beam has been within the reflectivity field buffer (three-dimensional buffer).

If the radar antenna is pointed in a particular direction to obtain measurements of the backscattered signal as a function of range, the mean value of this measurement is described by a radar equation. Considering only weather scatters, in one embodiment the radar equation is as follows:

$$P_{Rx} = K \int \frac{dr W_r(r)}{r^2} \int d\Omega G^2(\Omega) Z(r, \Omega) \tag{6}$$

where $P_{Rx}$ a signal power, K is a constant that includes the effects of transmit power, losses, etc., $W_r(r)$ is a range weighting function appropriate for the time of the received signal power, $G(\Omega)$ is antenna gain as a function of direction $\Omega$, and $Z(r,\Omega)$ is the reflectivity distribution.

In one embodiment, the received power is approximated by:

$$P_{Rx} \cong K \sum_n \frac{W_r(r_n) \delta r}{r_n^2} \sum_i G^2(\Omega_i) Z(r_n, \Omega_i) \delta\Omega \tag{7}$$

where $\delta r$ is an increment of range, $\delta\Omega$ is an increment of solid angle. The range weighting function and antenna gain function are evaluated at discrete points in the spatial coordinates $(r,\Omega)$. In order to simplify, the range weighting function $W_r$ is approximated as being roughly constant over a range interval of extent $\delta r$. Thus, the above approximation becomes:

$$P_{Rx} \cong \frac{K'}{r_n^2} \sum_i G^2(\Omega_i) Z(r_n, \Omega_i) \tag{8}$$

The summation over i approximates the integration over the antenna main beam in angle space (each term in the summation representing an incremental direction into space). Using the basis function expansion of the reflectivity field, the summation above is separated into groups of sums—each taken over a particular realization of a basis function. If the basis function is just a rectangular prism in a non-limiting example (which could be referred to as a voxel, where the reflectivity is assumed constant within the voxel), a unity weighting for each group of sums into a voxel is determined. Other basis functions can be used. In this case, the $h_k$'s is as follows:

$$h_k = \frac{K'}{r_n^2} \sum_i G^2(\Omega_i) \tag{9}$$

The summation is performed over only the incremental main beam directions that fall within a particular voxel.

Separation of ground scatter from weather scatter can be accomplished by estimating the distribution of ground NRCS simultaneously with the weather reflectivity field estimation. Therefore, a ground radar map is generated as part of estimating the weather reflectivity field.

The process for the estimation of ground NRCS is similar to the process for weather reflectivity estimation. The received power from ground backscatter is approximated by:

$$P_{Rx} \cong \frac{K}{r^3} \sum_i G^2(\phi_i, \theta_{gnd}) \sigma^0(r, \phi_i) \tag{10}$$

$\sigma^0(r,\phi)$ is the NRCS of the ground at the range r and azimuth angle $\phi_i$. The antenna gain is evaluated in the direction of the ground at this range and azimuth angle. The terrain elevation is previously known. The constant K includes radar design parameters and increments used in the numerical integration. By expanding the NRCS distribution in terms of a set of basis functions, Equation 10 is put in the following form $$P_{Rx} \cong \sum_k h_k \sigma_k^0 \tag{11}$$

By estimating weather and ground scattered power, the two components are separable. The separation is done because the change in ground scatter signal with change in antenna pointing angle (particularly tilt) changes in a predictable way. By making a number of comparisons of measurements and predicted measurement values at diverse antenna pointing angles, the process iteratively arrives at solutions that separate weather and ground scattering properties. An example scan strategy is to start at low tilt angles, and proceed toward high tilt angles. In this example, a good estimate of ground scatter is attained where it is not contaminated by weather scatter (lower tilt angles). These ground scatter estimates can then be used to predict the relative contribution of ground scatter to subsequent radar measurements, thereby revealing what portion of these measurements can be attributed to weather scatter.

While the preferred embodiment of the invention has been illustrated and described, as noted above, many changes can be made without departing from the spirit and scope of the invention. For example, a priori information is used to initialize both the estimated values and the associated uncertainty parameters for weather reflectivity and ground NRCS. Accordingly, the scope of the invention is not limited by the disclosure of the preferred embodiment.

The embodiments of the invention in which an exclusive property or privilege is claimed are defined as follows:

1. A method performed by a radar system on an aircraft, the method comprising:
   initializing uncertainty parameters of normalized radar cross section for ground elements based on a type of ground associated with each of the elements;
   initializing reflectivity uncertainty parameters for weather elements;
   receiving a radar measurement from the radar system as a result of a radar return from a transmitted radar beam;
   generating a prediction of a radar measurement based on current reflectivity distribution in space and how the radar system receives the measurements, an uncertainty parameter of the reflectivity distribution, and the initialized uncertainty parameters of normalized radar cross section of the ground elements;
   subtracting the generated prediction of the radar measurement from the received radar measurement;
   adjusting one or more reflectivity values based on the result of the subtraction; and
   storing the one or more adjusted reflectivity values, wherein the stored reflectivity values represent a portion of environment around the radar system.

2. The method of claim 1, wherein generating the prediction is further based on an antenna beam radiation pattern and a radar range weighting function.

3. The method of claim 1, wherein adjusting the reflectivity value includes updating a previously stored reflectivity value.

4. The method of claim 1, further comprising generating an estimate of ground normalized radar cross-section.

5. The method of claim 1, wherein initializing reflectivity uncertainty parameters for weather elements comprises initializing of weather uncertainty parameters based on a priori information.

6. The method of claim 5, wherein the a priori information comprises uplinked weather data.

7. A system comprising:
   a radar system for transmitting a radar signal and generating a radar measurement as a result of radar return of the transmitted radar signal;
   memory; and
   a processor coupled to the radar system and memory, the processor comprising:
   a first component configured to initialize uncertainty parameters of normalized radar cross section for ground elements based on a type of ground associated with each of the elements and initialize reflectivity uncertainty parameters for weather elements;
   a second component configured to generate a prediction of a radar measurement based on current reflectivity distribution in space and how the radar receives the measurements, an uncertainty parameter of the reflectivity distribution, and the initialized uncertainty parameters of normalized radar cross section of the ground elements;
   a third component configured to subtract the generated prediction of the radar measurement from the received radar measurement;
   a fourth component configured to adjust one or more reflectivity values based on the result of the subtraction; and
   a fifth component configured to store the one or more adjusted reflectivity values, wherein the stored reflectivity values represent a portion of environment around the radar system.

8. The system of claim 7, wherein the fourth component adjusts based on uncertainty of the reflectivity distribution.

9. The system of claim 7, wherein the fourth component generates based on an antenna beam radiation pattern and a radar range weighting function.

10. The system of claim 7, wherein the fourth component updates a previously stored reflectivity value.

11. The system of claim 7, wherein the processor further comprises a sixth component configured to generating an estimate of ground normalized radar cross-section.

12. The system of claim 7, wherein initializing reflectivity uncertainty parameters for weather elements comprises initializing of weather uncertainty parameters based on a priori information.

13. The system of claim 12, wherein the a priori information comprises uplinked weather data.

14. A computer program product residing on a computer readable medium, the computer program product comprising:
   a first component configured to initialize uncertainty parameters of normalize radar cross section for ground elements based on a type of ground associated with each of the elements and initialize reflectivity uncertainty parameters for weather elements;
   a second component configured to receive a radar measurement from a radar system as a result of a radar return from a transmitted radar beam;
   a third component configured to generate a prediction of a radar measurement based on current reflectivity distribution in space and how the radar receives the measurements, an uncertainty parameter of the reflectivity distribution, and the initialized uncertainty parameters of normalized radar cross section of the ground elements;
   a fourth component configured to subtract the generated prediction of the radar measurement from the received radar measurement;
   a fifth component configured to adjust one or more reflectivity values based on the result of the subtraction; and
   a sixth component configured to store the one or more adjusted reflectivity values, wherein the stored reflectivity values represent a portion of environment around the radar system.

15. The product of claim 14, wherein the fifth component adjusts further based on uncertainty of the reflectivity distribution.

16. The product of claim 14, wherein the third component generates based on an antenna beam radiation pattern and a radar range weighting function.

17. The product of claim 14, wherein the fifth component updates a previously stored reflectivity value.

18. The product of claim 14, further comprising a seventh component configured to generate an estimate of ground normalized radar cross-section.

19. The product of claim 14, wherein initializing reflectivity uncertainty parameters for weather elements comprises initializing of weather uncertainty parameters based on a priori information.

20. The product of claim 19, wherein the a priori information comprises uplinked weather data.

* * * * *